US009062856B2

(12) United States Patent
Van Bommel et al.

(10) Patent No.: US 9,062,856 B2
(45) Date of Patent: Jun. 23, 2015

(54) PRIMARY LIGHT CONVERTER FOR CONVERTING PRIMARY LIGHT INTO SECONDARY LIGHT

(75) Inventors: Ties Van Bommel, Horst (NL); Rifat Ata Mustafa Hikmet, Eindhoven (NL); Yongfeng Ni, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 353 days.

(21) Appl. No.: 13/508,993

(22) PCT Filed: Nov. 9, 2010

(86) PCT No.: PCT/IB2010/055078
§ 371 (c)(1),
(2), (4) Date: May 10, 2012

(87) PCT Pub. No.: WO2011/061658
PCT Pub. Date: May 26, 2011

(65) Prior Publication Data

US 2012/0228471 A1 Sep. 13, 2012

(30) Foreign Application Priority Data

Nov. 19, 2009 (EP) .................................... 09176503

(51) Int. Cl.
*G01J 1/44* (2006.01)
*F21V 14/00* (2006.01)
*F21V 23/04* (2006.01)

(52) U.S. Cl.
CPC ........... *F21V 14/003* (2013.01); *F21V 23/0442* (2013.01)

(58) Field of Classification Search
CPC .. G01J 1/4257; G01J 2001/4247; F21V 14/00
USPC ........... 250/205, 206, 214 R, 214 D, 214 SG, 250/214 C, 214 RC; 136/205, 243, 248, 252, 136/263; 315/86, 169.3; 126/572
See application file for complete search history.

(56) References Cited

U.S. PATENT DOCUMENTS

| | | | |
|---|---|---|---|
| 4,001,704 | A | 1/1977 | Danielmeyer et al. |
| 5,465,085 | A | 11/1995 | Caldwell et al. |

(Continued)

FOREIGN PATENT DOCUMENTS

| | | | |
|---|---|---|---|
| CN | 1936419 | A | 3/2007 |
| CN | 101358696 | A | 2/2009 |

(Continued)

OTHER PUBLICATIONS

K. Murakawa et al; "A Wireless Near-Infrared Energy System for Medical Implants", IEEE Engineering in Medicine and Biology, vol. 18, No. 6, pp. 70-72, Nov./Dec. 1999.

(Continued)

*Primary Examiner* — Kevin Pyo
(74) *Attorney, Agent, or Firm* — Meenakshy Chakravorty

(57) ABSTRACT

The invention relates to a primary light converter (1) for converting primary light (3) into secondary light (4). An electrical light conversion unit (2) converts at least a part of the primary light (3) into the secondary light (4), and an energy converter (5) converts at least a part of the primary light (3) into electrical energy, wherein the electrical light conversion unit (2) is adapted to be driven by the electrical energy from the energy converter (5). The invention relates further to a lighting apparatus comprising one or several of the primary light converters. It is not necessary to electrically connect the one or several primary light converters via a wire to an external power supply. This reduces the space required for the primary light converter and the lighting apparatus and increases the variability of possible arrangements of the one or several primary light converters and lighting systems comprising such primary light converters.

14 Claims, 6 Drawing Sheets

(56) References Cited

U.S. PATENT DOCUMENTS

| | | | | |
|---|---|---|---|---|
| 6,340,958 | B1 * | 1/2002 | Cantu et al. | 345/2.3 |
| 6,864,634 | B2 | 3/2005 | Veillette et al. | |
| 2006/0249202 | A1 | 11/2006 | Yoo et al. | |
| 2006/0266917 | A1 * | 11/2006 | Baldis et al. | 250/200 |
| 2009/0032085 | A1 | 2/2009 | Grumazescu | |
| 2010/0012819 | A1 * | 1/2010 | Graham | 250/205 |
| 2012/0001548 | A1 * | 1/2012 | Recker et al. | 315/86 |

FOREIGN PATENT DOCUMENTS

| | | | |
|---|---|---|---|
| CN | 101368671 | A | 2/2009 |
| JP | 8138425 | A | 5/1996 |
| JP | 2005222582 | A | 8/2005 |
| JP | 2006236584 | A | 9/2006 |
| WO | 2007007234 | A1 | 1/2007 |
| WO | 2007007235 | A2 | 1/2007 |
| WO | 2009066206 | A1 | 5/2009 |

OTHER PUBLICATIONS

N.J. Hwang et al; "Photovoltaic Energy Converter As a Chipscale High Efficiency Power Source for Implanted Active Microelectronic Devices", Proc of the 26th Annual Intnl Conf. of the IEEE EMBS, San Francisco, CA, Sep. 1-5, 2004.

Matthew Heino; "Opticalisolation Transformer for Pulsed Power Applications", Bechtel Nevada, Livermore, CA, USA, Photonic Power Business Unit, Milpitas CA, USA, 1999.

Jan-Gustav Werthen; "Powering Next Generation Networks by Laser Light Over Fiber", OFC/NFOEC, 2008.

* cited by examiner

PRIMARY LIGHT CONVERTER FOR CONVERTING PRIMARY LIGHT INTO SECONDARY LIGHT

FIELD OF THE INVENTION

The invention relates to a primary light converter for converting primary light into secondary light. The invention relates further to a lighting apparatus comprising the primary light converter and a corresponding lighting method.

BACKGROUND OF THE INVENTION

Known lighting systems or lighting apparatus comprise a light source for emitting light, wherein the light is controlled by means of a controller for controlling the light source or by means of electrically switchable elements like passive and active polarizing reflectors and other optical elements, for example, in the case of remote laser lighting systems for converting the laser light into desired converted light. Each of the electrically switchable elements or controllers of the light sources is connected via a wire to a power supply for addressing the electrically switchable elements or controllers of the light sources separately. Thus, excessive wiring is needed to connect all electrically switchable elements or controllers of the light sources to the power supply. This wiring needs a lot of space and limits the flexibility of lighting systems.

SUMMARY OF THE INVENTION

It is an object of the present invention to provide a primary light converter for converting primary light into secondary light, which needs less space and which can be arranged with an increased flexibility. It is a further object of the present invention to provide a lighting apparatus comprising the primary light converter and a corresponding lighting method.

In a first aspect of the present invention a primary light converter for converting primary light into secondary light is presented, wherein the primary light converter comprises:

an electrical light conversion unit for converting at least a part of the primary light into the secondary light, an energy converter for converting at least a part of the primary light into electrical energy, wherein the electrical light conversion unit is adapted to be driven by the electrical energy from the energy converter.

Since the primary light converter comprises an energy converter which converts at least a part of the primary light into electrical energy and since the electrical light conversion unit is electrically driven by the electrical energy from the energy converter, it is not necessary to electrically connect the primary light converter via a wire to a power supply. A lighting apparatus that comprises a light source for emitting primary light for being directed to one or several of the primary light converters does not need to connect each of the one or several primary light converters electrically via a wire to a power supply. This reduces the space required for the lighting apparatus and increases the variability of possible arrangements of the one or several primary light converters.

The energy converter is preferentially a photovoltaic element.

It is preferred that the primary light converter further comprises a beam splitter for splitting the primary light into a first part for being directed to the light conversion unit for being converted into the secondary light and into a second part for being directed to the energy converter for being converted into the electrical energy for driving the light conversion unit.

The light conversion unit can be adapted to be directly driven by the electrical energy.

It is further preferred that the beam splitter is adapted to split the primary light into a third part for being directed to a further primary light converter.

The primary light converter may comprise a mechanical coupler for coupling the primary light converter to a light source. The mechanical coupler like a clamp, a thread, glue or the like may enable an upgrade of existing light sources or lighting systems comprising a multitude of light sources. The primary light converter coupled to the light source, for example, a spot with one or more Light Emitting Diodes (LEDs), a laser based light source, a halogen spot, a large area light source like an Organic Light Emitting Diodes (OLED) or any other well known light source may enable the control of the light source regarding brightness, colour, light distribution or the like without the need of additional wiring.

Preferentially, that the primary light converter further comprises an electrical energy storing unit for storing the electrical energy from the energy converter and for providing the stored electrical energy to the light conversion unit. This allows electrically driving the electrical light conversion unit by electrical energy from the energy converter via the electrical energy storing unit, even if at the same time the primary light is not converted into electrical energy by the energy converter.

The electrical energy storing unit is preferentially a battery or a capacitor.

It is preferred that the primary light converter further comprises a beam splitter for splitting the primary light into a first part for being directed to the light conversion unit for being converted into the secondary light and into a second part for being directed to the electrical energy converter for being converted into the electrical energy for being stored in the electrical energy storing unit, wherein the electrical storing unit is connected to the beam splitter for driving the beam splitter by at least a part of the stored electrical energy, wherein the beam splitter is adapted to increase the intensity of the second part of the split primary light, if the stored electrical energy decreases. This allows converting primary light into electrical energy in dependence on the real need of electrical energy. In particular, if the electrical energy storing unit has stored electrical energy being sufficient to drive the electrical light conversion unit, the primary light is not used for being converted into electrical energy and can completely be converted into secondary light.

The light conversion unit is preferentially a color conversion unit, a light spreading unit or a light steering unit. Further examples of a light conversion unit may be based on Liquid Crystal technology. Examples of such LC technology includes but are not limited to Polymer Dispersed Liquid Crystal (PDLC) elements; Liquid Crystal Gels (LCG) elements; Gradient Index (GRIN) Liquid Crystal elements based on Double Plain Electrodes (DPE) technology, In Plain Switching (IPS) technology, Fringe Field Switching (FFS) technology; Cholesteric Liquid Crystal elements; or Liquid Crystal elements with replicated structures.

Other non-LC based technologies which can be used are electro-chromic elements, electro-wetting elements (e.g. from Liquavista), fluid focus based technology, (in plain electrode) electro-phoretic technology, suspended particle devices, and even MEMS technology.

The light conversion unit can comprise an electrically drivable switch which allows the generation of secondary light to be switched on or to be switched off.

Preferentially, the primary light converter comprises a further electrically drivable unit connected with the energy converter for driving the further electrically drivable unit with the electrical energy from the energy converter. The further electrically drivable unit can be driven directly by the electrical energy from the energy converter or by the electrical energy stored in the electrical energy storing unit. The further electrically drivable unit is preferentially at least one of a cooling unit for cooling the primary light converter and a sensor for sensing at least one of a presence and a movement of an object. The cooling unit is, for example, a cooling fan.

The sensor is preferentially adapted to generate a sensing signal depending on at least one of a presence and a movement of an object, wherein the electrical light conversion unit is adapted to convert the primary light into secondary light depending on the generated sensing signal. This allows, for example, converting the primary light into secondary primary light only if a presence or movement of an object like a person in the vicinity of the primary light converter has been detected. This can prevent an unnecessary use of electrical energy.

Moreover, the electrical light conversion unit can be adapted to convert the primary light into secondary light depending on the generated sensing signal such that the intensity of the secondary light is reduced, in particular, such that the secondary light is switched off, if a presence or movement of an object like a person in the vicinity of the primary light converter has been detected. This can improve eye-safety of the primary light converter.

In a further embodiment, the further electrically drivable unit is a sending unit for sending a signal to a light source generating the primary light or to a further primary light converter, for example, for sending position and/or location information indicating the position and/or location of the respective primary light converter. This position and/or location information can be used by the light source and/or a further primary light converter, which want to direct light to the respective primary light converter, for adjusting the light directed to the respective primary light converter. Accordingly, in this embodiment the light source and/or the further primary light converter preferentially comprises a receiving unit for receiving the signal sent by the respective primary light converter, wherein the light source and/or the further primary light converter is adapted to adjust the directing of the light to the respective primary light converter depending on the received signal.

It is preferred that the primary light converter further comprises a control unit for controlling at least one of the electrical light conversion unit and the energy converter, wherein the control unit is driven by the electrical energy from the energy converter.

For example, a light source generating the primary light can emit coded light, in particular, pulsed light. This coded light can be the primary light or it can be an additional light directed to the primary light converter. The control unit can be adapted to translate the coded light and to control the energy converter and/or the electrical light conversion unit accordingly. In an embodiment, the control unit comprises a light detector wherein a part of the primary light is directed to the light detector for generating an electrical signal depending on the detected light and wherein the control unit is adapted to translate the electrical signal of the light detector into controlling information for controlling the energy converter and/or the electrical light conversion unit. The coded light can, for example, carry the information that the respective primary light converter should be switched on or switched off, i.e. should be activated or should not be activated. In addition or alternatively, the coded light can carry information indicating desired characteristics of the secondary light.

If coded light is used for controlling several primary light converters, the coded light is preferentially amplitude modulated or phase modulated, wherein the modulation indicates which primary light converter has to be activated and which primary light converter should not be activated.

In a further embodiment, the control unit can comprise an electrical signal receiving unit for wirelessly receiving control information from an external controller for controlling the primary light converter. This may enable the independent control of a multitude of primary light converters. An existing lighting system comprising a multitude of light sources may be upgraded by mechanically coupling primary light converters to the light sources and controlling the light sources via the external controller without the need of additional wiring.

In a further aspect of the present invention a lighting apparatus is presented, wherein the lighting apparatus comprises:

a light source for emitting primary light for being directed to a primary light converter, a primary light converter for converting the primary light into secondary light.

The light source is preferentially a laser a light emitting diode, an OLED or an conventional lamp comprising an incandescent lighting device or a halogen lighting device.

Preferentially, the lighting apparatus comprises a waveguide for guiding the primary light from the light source to the primary light converter. The waveguide is, for example, an optical fiber or another kind of waveguide. The primary light can also travel from the light source to the primary light converter through air or vacuum.

It is further preferred that the lighting apparatus comprises a plurality of the primary light converters, wherein the light source is adapted to emit primary light for being directed to the plurality of primary light converters.

It is preferred that the lighting apparatus further comprises a controller for controlling the directing of the primary light to the plurality of primary light converters. In particular, the controller can be adapted to generate different light patterns by controlling the directing of the primary light to the plurality of primary light converters differently. For example, for generating a first light pattern the primary light can be directed to a first group of primary light converters and for generating a second light pattern the primary light can be directed to a second group of primary light converters. For directing the primary light to different primary light converters the light source preferentially also comprises a redirection element for redirecting the primary light to the desired one or several primary light converters.

It is further preferred that a first primary light converter of the plurality of primary light converters comprises a beam splitter for splitting the primary light into a first part for being directed to the light conversion unit for being converted into the secondary light, into a second part for being directed to the energy converter for being converted into the electrical energy for driving the light conversion unit, and into a third part for being directed to a second primary light converter of the plurality of primary light converters as primary light of the second primary light converter. This allows to create a network of primary light converters and/or to form a cascade of light, wherein primary light is directed to a first primary light converter for converting the primary light—inter alia—into a third part for being directed to a second primary light converter of the plurality of primary light converters as primary light of the second primary light converter.

It is further preferred that a first primary light converter of the plurality of primary light converters is adapted to convert the primary light into secondary light such that the secondary light is directed to a second primary light converter of the plurality of primary light converters as primary light of the second primary light converter. Also this can be used to create a network of primary light converters and/or to form a cascade of light, wherein primary light is directed to a first primary light converter for converting the primary light into secondary light which is directed to a second light converter as primary light of the second light converter. Such a cascade can, for example, be used if the primary light of the light source cannot directly reach the second light converter. The secondary light of the first primary light converter is regarded as primary light for the second primary light converter, wherein the secondary light of the first primary light converter is used for being converted into electrically energy and for being converted into converted light being secondary light of the second primary light converter.

It is further preferred that the light source comprises a first lighting unit for providing a first part of the primary light and a second lighting unit for providing a second part of the primary light, wherein the lighting apparatus is adapted to direct the first part to the light conversion unit of the primary light converter and to direct the second part to the energy converter of the primary light converter. This allows optimizing the first part of the primary light for the process of converting the primary light into the secondary light and optimizing the second part of the primary light for the process of converting the electrical conversion light into electrical energy separately, i.e. both processes can be separately optimized.

In a further aspect of the present invention a lighting method is presented, wherein the lighting method comprises following steps:

- emitting primary light for being directed to a primary light converter by a light source,
- converting at least a part of the primary light into electrical energy by an energy converter,
- converting at least a part of the primary light into secondary light by an electrical light conversion unit, wherein the electrical light conversion unit is driven by the electrical energy from the energy converter.

In a further aspect of the present invention a lighting computer program is presented, wherein the lighting computer program comprises program code means for causing a lighting apparatus to carry out the steps of the lighting method, when the computer program is run on a computer controlling the lighting apparatus. The lighting apparatus preferentially comprises a controller on which the lighting computer program is executable for causing the lighting apparatus to carry out the steps defined by the lighting method.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
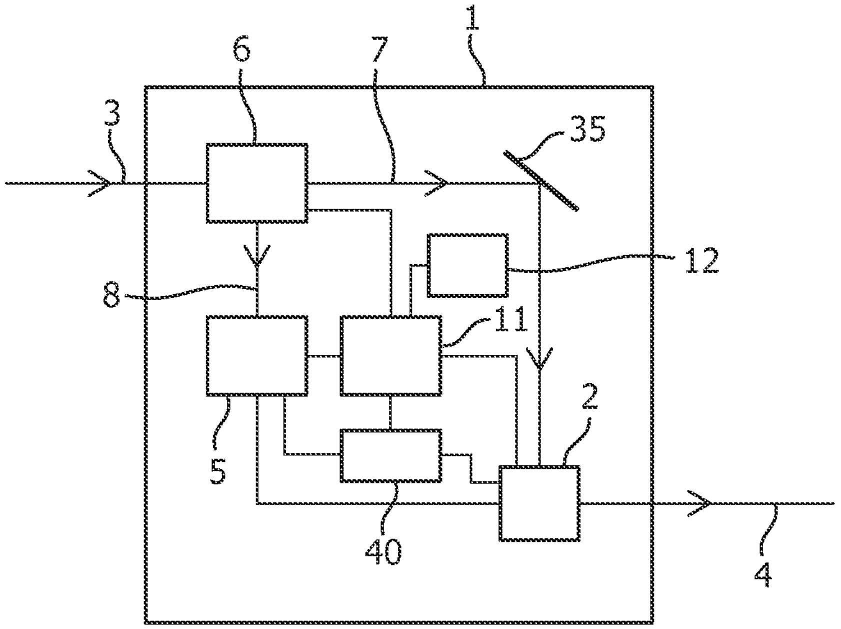
FIG. 1 shows schematically and exemplarily a primary light converter.

FIG. 1 shows schematically and exemplarily a primary light converter 1 for converting primary light 3 into secondary light 4. The primary light converter 1 comprises an electrical light conversion unit 2 for converting at least a part of the primary light 3 into the secondary light 4. The primary light converter 1 further comprises an energy converter 5 for converting at least a part 8 of the primary light 3 into electrical energy, wherein the electrical light conversion unit 2 is adapted to be driven by the electrical energy from the energy converter 5. The energy converter 5 is preferentially a photovoltaic element.

The primary light converter 1 further comprises a beam splitter 6 for splitting the primary light 3 into a first part 7 for being directed to the light conversion unit 2 for being converted into the secondary light 4 and into the second part 8 for being directed to the energy converter 5 for being converted into the electrical energy for driving the primary light converter. In this embodiment, the first part 7 is directed to the light conversion unit 2 via a mirror 35.

The light conversion unit 2 can be adapted to be directly driven by the electrical energy from the energy converter 5 and/or to be driven by the electrical energy from an electrical energy storing unit 11. The electrical energy storing unit 11 is adapted to store the electrical energy from the energy converter 5 and for providing the stored electrical energy to the light conversion unit 2. This allows electrically driving the electrical light conversion unit 2 by electrical energy from the energy converter 5 via the electrical energy storing unit 11, even if at the same time the primary light 3 is not converted into electrical energy by the energy converter 5. The electrical energy storing unit 11 is preferentially a battery or a capacitor.

The electrical storing unit 11 is connected to the beam splitter 6 for driving the beam splitter 6 by at least a part of the stored electrical energy, wherein the beam splitter 6 is adapted to increase the intensity of the second part 8 of the split primary light, if the stored electrical energy decreases. The beam splitter is therefore preferentially an electrically switchable beam splitter for light tapping. This allows converting primary light into electrical energy depending on the real need of electrical energy. In particular, if the electrical energy storing unit 11 has stored electrical energy being sufficient to drive the electrical light conversion unit 2, the primary light 3 is not used for being converted into electrical energy and can completely be converted into secondary light 4.

The light conversion unit 2 is preferentially a color conversion unit, a light spreading unit or a light steering unit. A color conversion unit comprises, for example, a phosphor material for transforming light of a narrow wavelength range, for example, of 450 nm, into white light, for example, with a wavelength distribution between 450 nm and 750 nm. The color conversion unit may comprise different phosphor materials for converting the primary light into different wavelength distributions, wherein the color conversion unit can comprise an electrically drivable steering unit for steering the primary light to a desired phosphor material.

A light spreading unit comprises preferentially a diffuser or a grating for redirecting collimated laser light into many directions. The light spreading unit can comprise several spreading members like several diffusers and/or different gratings, wherein for obtaining a desired spreading of the light the light spreading unit preferentially comprises an electrically drivable redirection element like a mirror for directing the light to the respective spreading member. Also a lens can be used as spreading member. Moreover, the light spreading unit can also comprise an electrically drivable liquid crystal cell for modifying the spreading of the light. By modifying the spreading of the light preferentially the collimation and/or the shape of the secondary light 4 can be modified.

The light steering unit is preferentially adapted to redirect the secondary light into a desired direction. The steering unit preferentially comprises one or several steering members, wherein, if several steering members are used, different steering members steer the light into different directions. A steering member is, for example, an electrically drivable mirror or an electrically drivable liquid crystal beaming device.

The primary light converter 1 comprises a further electrically drivable unit 12 connected with the energy converter 5 for driving the further electrically drivable unit 12 with the electrical energy from the energy converter 5. In this embodiment, the further electrically drivable unit 12 is driven indirectly by the electrical energy stored in the electrical energy storing unit 11. However, in another embodiment, the further electrically drivable unit 12 can also be adapted to be driven directly by the energy converter 5.

The further electrically drivable unit 12 is preferentially a cooling unit for cooling the primary light converter 1 or a sensor for sensing at least one of a presence and a movement of an object. The cooling unit is, for example, a cooling fan, and the sensor is preferentially a distance and/or a movement sensor including but not limited to an infrared sensor and an ultrasound sensor. Preferentially, the electrical light conversion unit 5 is adapted to convert the primary light 3 into secondary light 8 depending on the sensing signal generated by the sensor. This allows, for example, converting the primary light into secondary primary light only if a presence or movement of an object like a person in the vicinity of the primary light converter has been detected. This can prevent an unnecessary use of electrical energy. In an embodiment, the electrical light conversion unit 5 is adapted to convert the primary light 3 in a narrower beam, if the presence of a person in the vicinity of the primary light converter has been detected, and to convert the primary light into a broader beam, if a presence of a person in the vicinity of the primary light converter has not been detected. The narrower beam is preferentially directed onto an object, to which the attention of the person should be directed, like a certain object in a shop window.

It is also possible that the electrical light conversion unit 5 is adapted to convert the primary light into secondary light depending on the sensing signal such that the intensity of the secondary light is reduced, in particular, such that the secondary light is switched off, if the sensing signal indicates a presence or movement of an object like a person in the vicinity of the primary light converter. This can improve eye-safety of the primary light converter.

The primary light converter 1 further comprises a control unit 40 for controlling at least one of the electrical light conversion unit 2 and the energy converter 5. Also the control unit 40 is driven by the electrical energy from the energy converter 5 and/or from the electrical energy storing 11. In this embodiment, the control unit 40 comprises a receiving unit for wirelessly receiving control signals from an external controller which may be part of a light source generating the primary light or which may be also external from the light source. The control unit 40 controls at least one of the electrical light conversion unit 2 and the energy converter 5 depending on the received control signal. The control signal can, for example, define whether the primary light converter should generate secondary light or not, i.e. whether the primary light converter should be activated or not. Moreover, the control signal can indicate the characteristics of the secondary light, for example, the intensity, collimation, color, direction, et cetera. The receiving unit of the control unit 40 can be adapted to receive wirelessly electromagnetic waves like known from WLAN networks. However, the receiving unit of the control unit 40 can also be a light detector for detecting coded light carrying the control signal. The coded light can be the primary light, wherein the beam splitter is preferentially adapted to split the primary light in a further part for being directed to the light detector of the control unit, or a further light beam can be provided by a light source of a lighting apparatus, wherein this further light beam is coded and directed to the light detector of the control unit.

Figure 2:
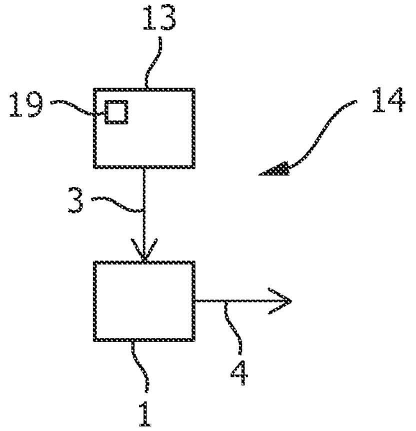
FIG. 2 shows schematically and exemplarily a lighting apparatus comprising the primary light converter.

FIG. 2 shows schematically and exemplarily a lighting apparatus 14 comprising a light source 13 for emitting primary light 3 for being directed to the primary light converter 1. The primary light converter 1 converts the primary light 3 into secondary light 4. The light source 13 is preferentially a laser or a light emitting diode. The lighting apparatus can comprise a waveguide for guiding the primary light from the source to the primary light converter. The waveguide is, for example, an optical fiber or another kind of waveguide. The primary light can also travel from the light source 13 to the primary light converter 1 through air or vacuum as exemplarily and schematically shown in FIG. 2.

Figure 3:
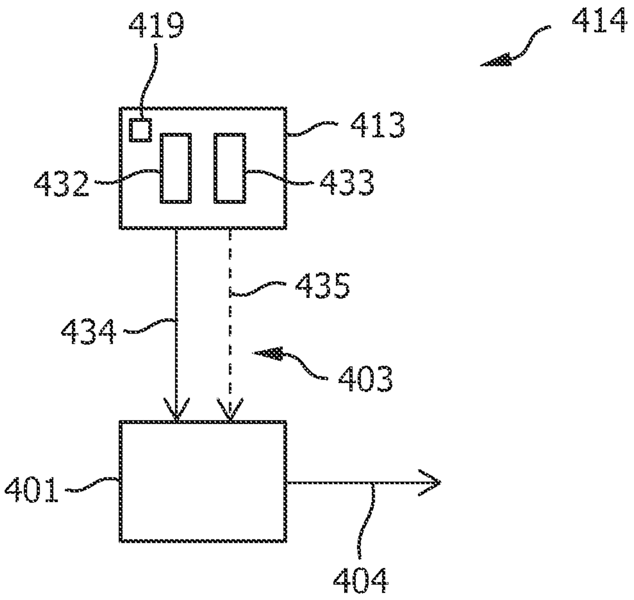
FIG. 3 shows schematically and exemplarily a further lighting apparatus.

FIG. 3 shows schematically and exemplarily a further embodiment of a lighting apparatus 414. Also the lighting apparatus 414 comprises a light source 413 for emitting primary light 403 for being directed to a primary light converter 401. In this embodiment, the light source 413 comprises a first lighting unit 432 for providing a first part 434 of the primary light 403 and a second lighting unit 433 for providing a second part 435 of the primary light 403, wherein the lighting apparatus 414 is adapted to direct the first part 434 to the light conversion unit of the primary light converter 401 and to direct the second part 435 to the energy converter of the primary light converter 401. This allows optimizing the first part of the primary light for the process of converting the primary light into the secondary light and optimizing the second part of the primary light for the process of converting the primary light into electrical energy separately, i.e. both processes can be separately optimized. In this embodiment, the primary light converter 401 preferentially does not comprise a beam splitter like the beam splitter 6 described above with reference to FIG. 1 for splitting primary light into a first part for being directed to the light conversion unit for being converted into secondary light and into a second part for being directed to the energy converter for being converted into the electrical energy for driving the light conversion unit. However, the primary light converter 401 can comprise a beam splitter to split the first part and/or the second part of the primary light 403 into a third part for being directed to a further primary light converter.

Figure 4:
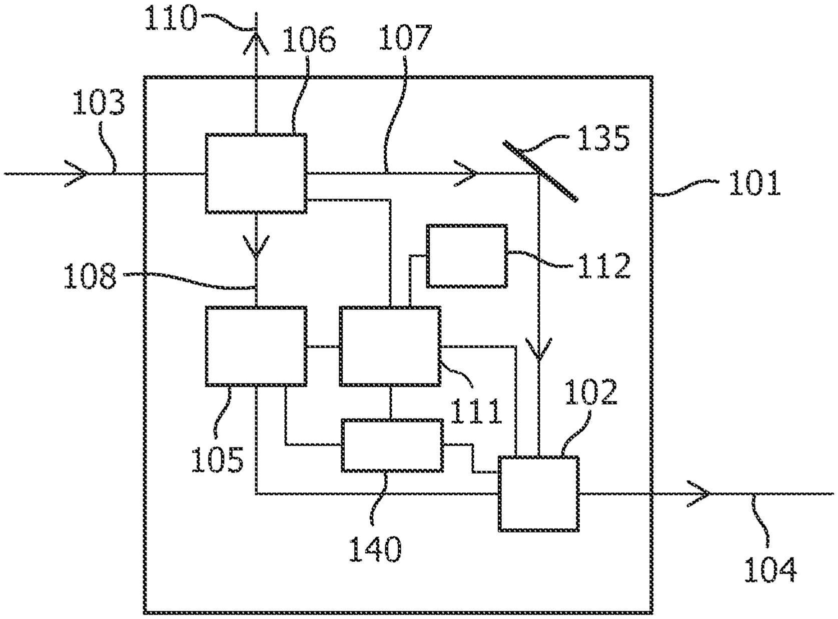
FIG. 4 shows schematically and exemplarily a further primary light converter.

FIG. 4 shows schematically and exemplarily a further embodiment of a primary light converter. The primary light converter 101 is similar to the primary light converter 1 described above with reference to FIG. 1. The main difference between these two primary light converters is the beam splitter. The beam splitter 106 of the primary light converter 101 shown in FIG. 4 is adapted to split the primary light 103 into a first part 107 for being directed to the light conversion unit 102 for being converted into secondary light 104, into a second part 108 for being directed to an energy converter 105 for being converted into electrical energy for driving the electrical light conversion unit 102, and into a third part 110 for being directed to a further primary light converter. The further elements of the primary light converter 101 like the electrical energy storing unit 111, the further electrically drivable unit 112, the mirror 135 and the control unit 140 are similar to the corresponding elements of the primary light converter 1 described above with reference to FIG. 1.

Figure 5:
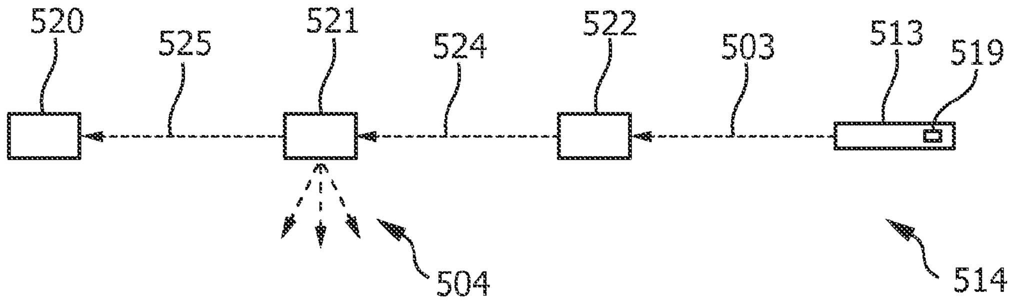
FIGS. 5 and 6 show schematically and exemplarily a further lighting apparatus, wherein in FIGS. 5 and 6 different primary light converters are activated.
Figure 6:
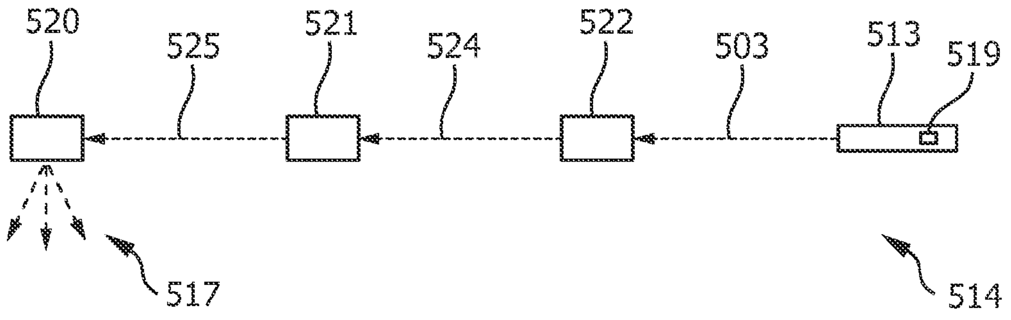

FIGS. 5 and 6 show schematically and exemplarily a further embodiment of a lighting apparatus. The lighting apparatus 514 comprises a light source 513 for emitting primary light 503 for being directed to a primary light converter. The light source is preferentially a laser or a light emitting diode. The lighting apparatus 514 comprises a plurality of primary light converters 520, 521, 522. In this embodiment, the primary light converters 521, 522 are preferentially from the type described above with reference to FIG. 4, i.e. these primary light converters 521, 522 comprise preferentially a beam splitter which allows to split an incoming primary light beam into three parts, wherein a third part can be directed to a further primary light converter. The primary light converter 520 can also be of the type described above with reference to FIG. 4 or the primary light converter 520 can be of the type described above with reference to FIG. 1, wherein a beam splitter splits the incoming primary light beam into two parts, wherein the first part can be converted into secondary light and the second part can be converted into electrical energy for driving the electrical light conversion unit of the primary light converter.

In FIGS. 5 and 6, the primary light 503 from the light source 513 is directed to a first primary light converter 522, wherein the first primary light converter 522 splits the primary light 503 preferentially into different parts, wherein one of these parts indicated in FIGS. 5 and 6 by reference number 524 is directed to a second primary light converter 521. The second primary light converter 521 splits preferentially the incoming light beam 524 in different parts, wherein one of these parts is directed to a light conversion unit of the second primary light converter 521 to convert the incoming light beam 524 into secondary light 504. Another part of the incoming light beam 524 is indicated by reference number 525 and directed to a third primary light converter 520. By activating a beam splitter in a respective primary light converter light can be extracted at a desired point. FIG. 5 shows a situation in which the second primary light converter 521 is activated. In FIG. 6, the third primary light converter 520 is activated for generating secondary light 517.

The light sources described above and below comprise preferentially a controller for generating control signals for controlling the one or several primary light converters of the respective lighting apparatus. The control signals are preferentially wirelessly send to the respective control units of the primary light converters. However, as already mentioned above, the controllers of the light sources can also be adapted to code the primary light in accordance with the control signal for transferring the control signal to the primary light converters. Moreover, it is also possible that the primary light converters do not comprise a control unit, wherein a primary light converter is activated, if the light source directs primary light to the respective primary light converter, and wherein a primary light converter is not activated, if the light source does not direct primary light to the respective primary light converter. The controller can be external or internal of the light source of the lighting apparatus. In FIGS. 2 and 3 a controller is schematically and exemplarily indicated by reference numbers 19 and 419, respectively. In FIGS. 5 and 6 a controller is schematically and exemplarily indicated by reference number 519.

The lighting apparatus can be adapted such that all primary light converters emit secondary light or such that only some activated primary light converters emit secondary light.

As already mentioned above, the lighting apparatus can comprise waveguides for guiding the light from the light source to the primary light converters and for guiding the light between the different primary light converters. For example, optical fibers or another kind of optical waveguide can be used for transferring the light from the light source to the primary light converters and/or between the different primary light converters.

Figure 7:
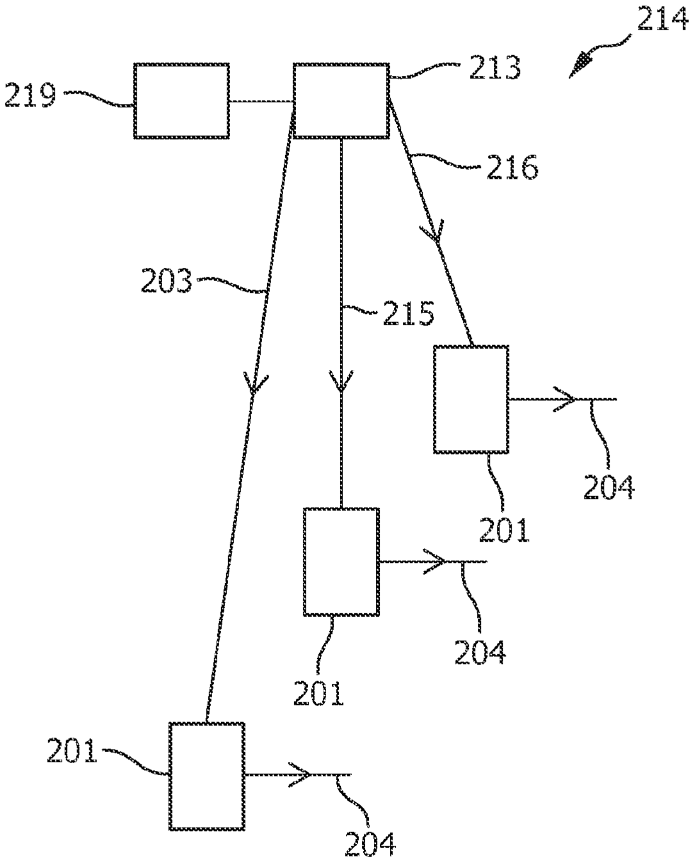
FIGS. 7 to 9 show further lighting apparatuses.

FIG. 7 shows schematically and exemplarily a further embodiment of a lighting apparatus. The lighting apparatus 214 comprises a light source 213 for emitting primary light 203, 215, 216 for being directed to primary light converters 201. The primary light converters 201 are preferentially primary light converters of the type described above with reference to FIG. 1 or FIG. 4. In this embodiment, the primary light converters 201 are similar. However, in another embodiment, the lighting apparatus can also comprise different primary light converters which convert the primary light differently into secondary light 204.

The lighting apparatus 214 further comprises a controller 219 for controlling the directing of the primary light 203, 215, 216 to the plurality of light converters 201. In particular, the controller 219 can be adapted to generate different light patterns by controlling the directing of the primary light 203, 215, 216 to the plurality of primary light converters 201 differently. For example, for generating a first light pattern the primary light can be directed to a first group of primary light converters and for generating a second light pattern, the primary light can be directed to a second group of primary light converters. The lighting apparatus 214 shown in FIG. 7 can be used to easily implement complicated controlling topologies by putting the primary light converters 201 at desired places and by simply adjusting the primary light of the laser beam to the primary light converters. Additional installation efforts like the installation of wiring for controlling the different primary light converts is preferentially not needed.

Figure 8:
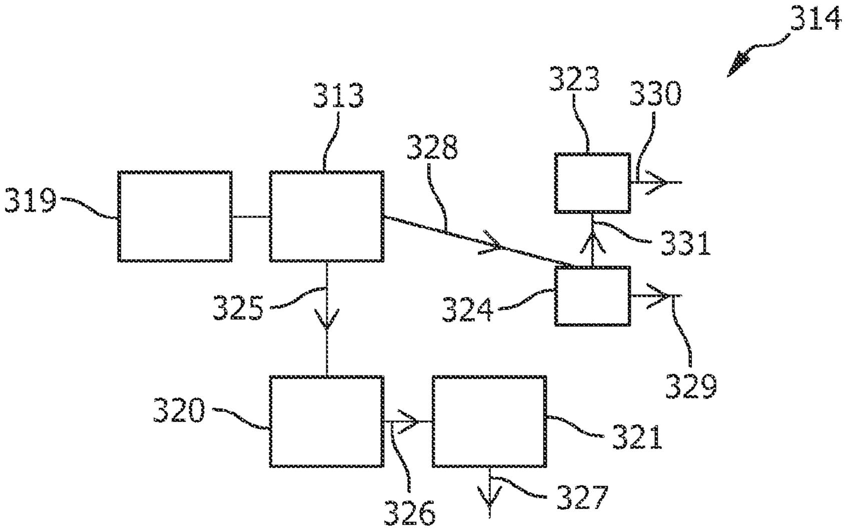

FIG. 8 shows schematically and exemplarily a further embodiment of a lighting apparatus. The lighting apparatus 314 comprises a light source 313 for emitting primary light 325, 328 for being directed to primary light converters 320, 324. The lighting apparatus comprises a plurality of light converters 320, 321, 323, 324 for converting the primary light 325, 328 into secondary light 326, 327, 329, 330. Also the lighting apparatus 314 comprises a controller 319 for controlling the directing of the primary light 325, 328 to the plurality of primary light converters. Primary light 325 is directed to the primary light converter 320 which is adapted to convert the primary light 325 into secondary light 326 such that the secondary light 326 is directed to a second primary light converter 321 of the plurality of primary light converters as primary light of the second primary light converter 321. The primary light converter 321 generates secondary light 327. The primary light converters 320, 321 are preferentially similar to the primary light converter 1 described above with reference to FIG. 1.

The primary light converter 324 is preferentially similar to the primary light converter 101 described above with reference to FIG. 4 and comprises therefore preferentially a beam splitter for splitting the primary light 328 into a first part for being directed to the light conversion unit for being converted into the secondary light 329, into a second part for being directed to the energy converter for being converted into the electrical energy for driving the light conversion unit, and into a third part 331 for being directed to a further primary light converter 323 as primary light of the further primary light converter 323. The further primary light converter 323 is preferentially similar to the primary light converter 1 described above with reference to FIG. 1 and converts the third part 331 into secondary light 330.

A plurality of primary light converters, for example, as described above with reference to FIG. 1 and/or as described above with FIG. 4, can be connected to create a network or cascade of light, wherein a primary light converter can be powered directly by the light source or by light from another primary light converter.

Figure 9:
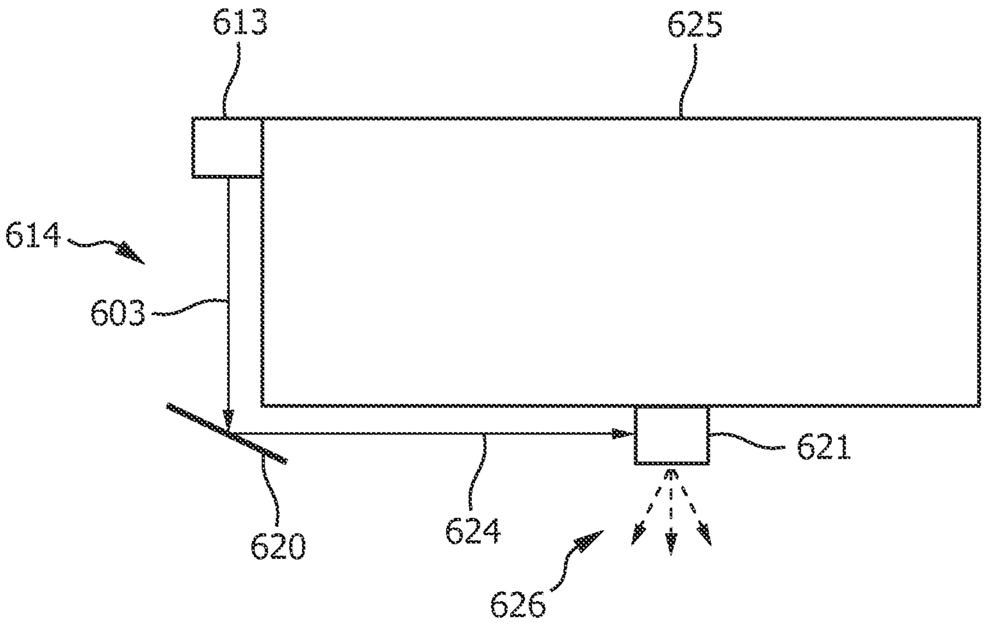

If a primary light converter should be installed at a place which cannot directly be reached by primary light of the light source of the lighting apparatus, a cascade configuration can be used for transmitting the primary light of the light source to the primary light converter. FIG. 9 shows schematically and exemplarily a simple lighting apparatus comprising one cascade step. However, the lighting apparatus could also form a multi-step cascade.

The lighting apparatus 614 schematically and exemplarily shown in FIG. 9 comprises a light source 613 for emitting primary light 603 for being directed to a primary light converter. In this embodiment, the primary light 603 of the light source 613 cannot directly be directed to the primary light converter 621 of the lighting apparatus 614 because of an object 625. Therefore, an electrically drivable redirection element 620 being a further primary light converter is used for directing the primary light 603 via the element 620 to the primary light converter 621. The primary light converter 621 converts the incoming light 624 into secondary light 626. The redirection unit 620 comprises an energy converter for converting a part of the primary light 603 into electrical energy for driving a redirection element of the redirection unit 620. The redirection element is preferentially an electrically drivable mirror. The object 625 shown in FIG. 9 is intransparent to the light emitted by the light source 613 and prevents the primary light 603 to be directly directed to the primary light converter 621. Also in this embodiment, the light source 613 can comprise a controller for controlling the lighting apparatus. The primary light converter 621 and optionally also the redirection element 620 can comprise control units for controlling the primary light converter 621 and the redirection element 620, respectively. However, it is also possible that the light source 613 does not comprise a controller and the primary light converter 621 and optionally also the redirection element 620 do not comprise control units, wherein the primary light converter 621 and optionally also the redirection element 620 are activated, if light is directed to the primary light converter 621 and the redirection element 620, respectively.

Figure 10:
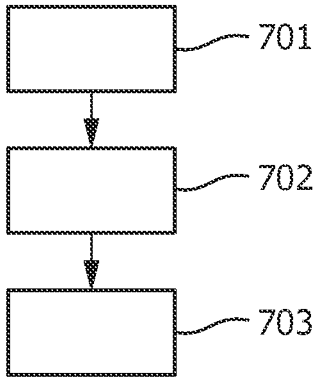
FIG. 10 shows a flowchart exemplarily illustrating a lighting method.

In the following a lighting method will be exemplarily described with reference to a flowchart shown in FIG. 10.

In step 701*a* light source of a lighting apparatus emits primary light which is directed to a primary light converter of the lighting apparatus. In step 702 at least a part of the primary light is converted into electrical energy by an energy converter of the primary light converter, and in step 703 at least a part of the primary light is converted into secondary light by an electrical light conversion unit of the primary light converter, wherein the electrical light conversion unit is driven by the electrical energy from the energy converter.

Figure 11:
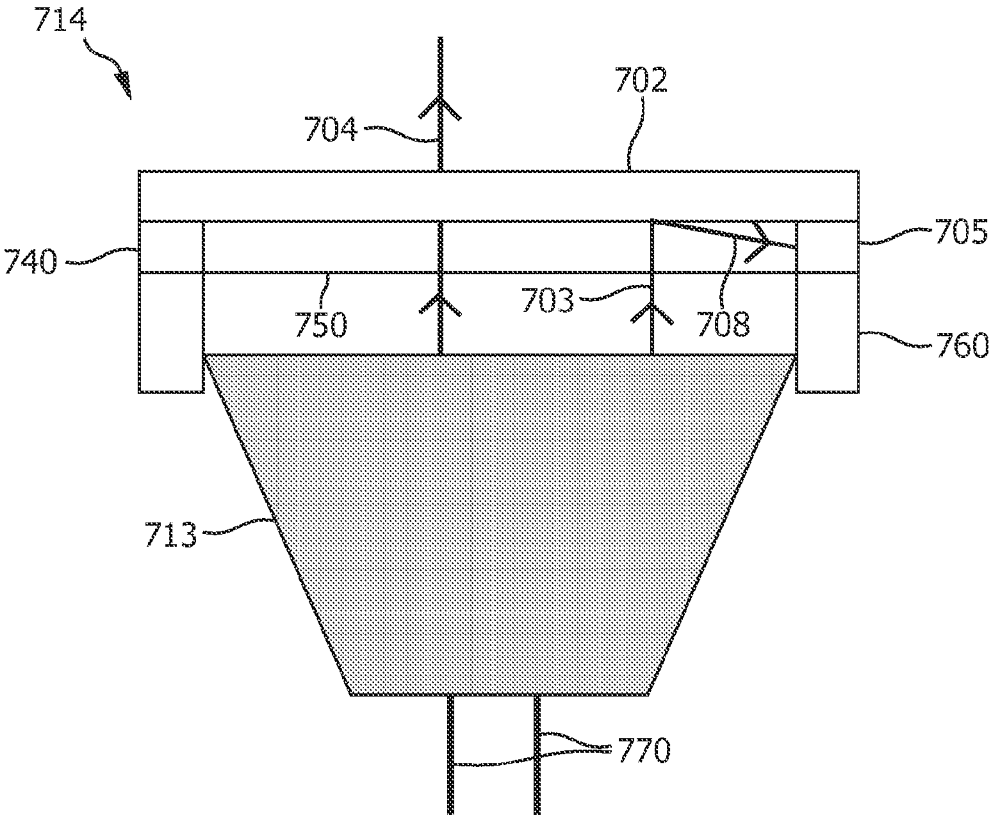
FIG. 11 shows schematically and exemplarily another lighting apparatus.

The lighting apparatus 714 schematically and exemplarily shown in FIG. 11 comprises a light source 713 like a halogen spot for emitting primary light 703 for being directed to a primary light converter. The primary light converter comprises a light guide structure 750, a light conversion unit 702, for example, a liquid crystal cell, an energy converter 705, a control unit 40 and a mechanical coupler 760, for example, a clamp for coupling the primary light converter to the halogen spot. The primary light enters the light guide structure, for example, a sheet of glass. A first part of the primary light passes the interface between the light guide structure and the conversion unit and is converted to secondary light 704 by means of the conversion unit. A second part 708 of the primary light is reflected at the interface between the light guide structure and the conversion unit and is received by the energy converter via the light guide structure for being converted to electrical energy for driving the primary light converter. The control unit comprises a receiving unit (not shown) for receiving wireless commands from an external controller. Thus, a halogen spot being coupled to an electrical power source via two wires 770 can be controlled by means of the primary light converter without additional wires.

Figure 12:
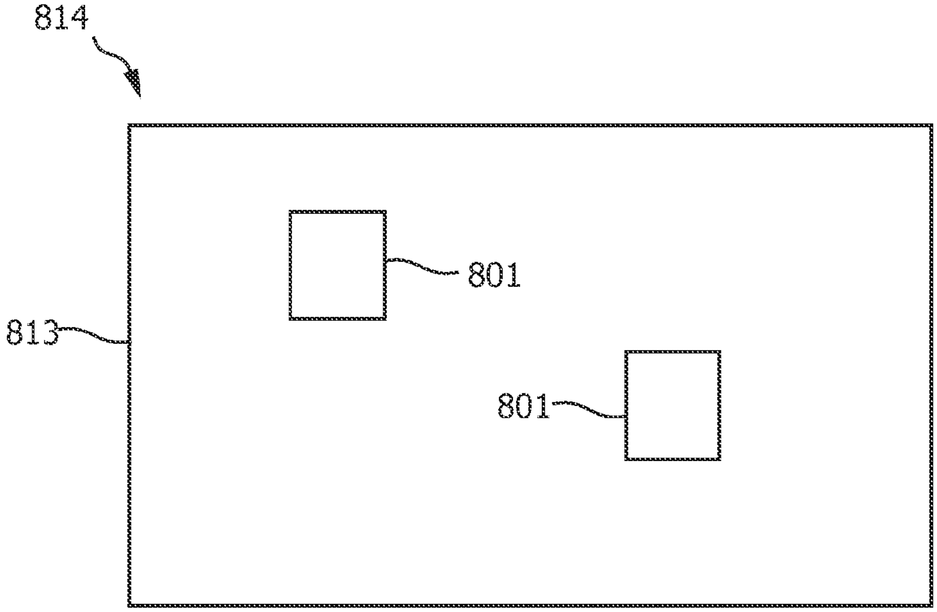
FIG. 12 shows schematically and exemplarily still another lighting apparatus

FIG. 12 shows schematically and exemplarily a further embodiment of a lighting apparatus comprising a large area light source 813 like an OLED. Two primary light converters 801 are mechanically coupled to the OLED, for example, by means of transparent glue in order to convert a part of the primary light emitted by the OLED to secondary light having, for example, different colors as the primary light.

The lighting apparatus in accordance with the invention allows generating the primary light at a place being remote from a place where the secondary light, which is preferentially used for illumination purposes, is generated. The light source which generates the primary light can be located a fixed place from which the primary light is distributed by primary light converters which comprise light conversion units and optionally further optical elements like mirrors and splitters. For example, starting from a single high power point generated by the light source the primary light can be splitted and converted into secondary light at a number of points. The primary light converters can comprises passive and/or active polarizing reflectors and other optical elements, in order to determine the intensity of the secondary light at the different points where the primary light converters are placed. For example, if a light conversion unit of a primary light converter comprises phosphor material, this primary light converter can be used to convert the primary light, which is preferentially laser light, to white light or various other colors using luminescent layers. The primary light converters comprise preferentially electrically switchable elements which are preferentially the light conversion units and which need electrical power in order to be activated, for example, for adjusting light splitting points, the color, the distribution of converted light, et cetera. A primary light converter can also comprise further electrical elements like sensors such as movement or presence detection sensors for smart light spaces which also need electricity. In order to avoid excessive wiring for electrically connecting the primary light converters, the primary light converters comprise energy converters, in particular, photovoltaic elements, which can tap a fraction of the primary light in order to activate the desired optical functions. These elements can further be remotely controlled avoiding the use of a large number of switches.

A distance between a primary light converter and another primary light converter, and/or the distance between a light source for emitting primary light and a primary light converter, is, for example, 10 meters in an office room or up to 50 meters in a corridor. However, these distances can also be smaller or larger depending on the desired application of the lighting apparatus.

The primary light converter can also comprise a laser as electrically drivable element. This laser is preferentially powered by the energy generated by the energy converter directly or via an electrical energy storing unit of the primary light converter. The light of the laser can be used, for example, as secondary light for illumination purposes or for being directed to another primary light converter for forming a cascade of primary light converters. Instead of or in addition to the laser a primary light converter can also comprise a light emitting diode.

The lighting apparatus can be used in various applications, for example, in homes and buildings, for instance, on ceilings, walls such as wall paper, light tiles, building facades, skirting boards, doors, or on floors such as carpets, parquet, floor tiles, stairs, et cetera.

The lighting apparatus can also be used in furniture like cupboards, tables, chairs, et cetera, or in vehicles such as cars, planes, trains, busses, et cetera. The lighting apparatus can also be used with an infrastructure such as ways, pavement, et cetera, and in toys, clothing, implantables, et cetera.

Although in the above described embodiments, certain features are only described with certain embodiments, a person skilled in the art readily understands that the features of different embodiments can be combined to create a new embodiment. For example, a light source comprising a first lighting unit for providing a first part of the primary light and a second lighting unit for providing a second part of the primary light, wherein the first part is directed to the light conversion unit of a primary light converter and wherein the second part is directed to an energy converter of the primary light converter, as described above with reference to FIG. 3 can also be used in other embodiments of the lighting apparatus.

Although in the above described embodiments, the primary light converters and the lighting apparatuses comprise several certain elements, the primary light converters and the lighting apparatuses can also comprise less elements. For example, the primary light converters described above with reference to FIGS. 1 and 4 comprise an electrical energy storing unit and a further electrically drivable element. However, other embodiments may not comprise an electrical energy storing unit and/or a further electrically drivable element. Moreover, a lighting apparatus can comprise one or more light sources like one or more lasers and/or light emitting diodes, and one or more primary light converters of the same type or of different types.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The control of the lighting apparatus in accordance with the lighting method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a primary light converter for converting primary light into secondary light. An electrical light conversion unit converts at least a part of the primary light into the secondary light, and an energy converter converts at least a part of the primary light into electrical energy, wherein the electrical light conversion unit is adapted to be driven by the electrical energy from the energy converter. The invention relates further to a lighting apparatus comprising one or several of the primary light converters. It is not necessary to electrically connect the one or several primary light converters via a wire to an external power supply. This reduces the space required for the primary light converter and the lighting apparatus and increases the variability of possible arrangements of the one or several primary light converters.

The invention claimed is:

1. A primary light converter for converting primary light into secondary light, the primary light converter comprising:

an electrical light conversion unit for converting at least a part of the primary light into the secondary light, an energy converter for converting at least a part of the primary light into electrical energy, wherein the electrical light conversion unit is adapted to be driven by the electrical energy from the energy converter.

2. The primary light converter as defined in claim 1, further comprising a beam splitter for splitting the primary light into a first part for being directed to the light conversion unit for being converted into the secondary light and into a second part for being directed to the energy converter for being converted into the electrical energy for driving the light conversion unit.

3. The primary light converter as defined in claim 1, further comprising a mechanical coupler for coupling the primary light converter to a light source.

4. The primary light converter as defined in claim 1, further comprising an electrical energy storing unit for storing the electrical energy from the energy converter and for providing the stored electrical energy to the light conversion unit.

5. The primary light converter as defined in claim 4, further comprising a beam splitter for splitting the primary light into a first part for being directed to the light conversion unit for being converted into the secondary light and into a second part for being directed to the electrical energy converter for being converted into the electrical energy for being stored in the electrical energy storing unit, wherein the electrical storing unit is connected to the beam splitter for driving the beam splitter by at least a part of the stored electrical energy, wherein the beam splitter is adapted to increase the intensity of the second part of the split primary light, if the stored electrical energy decreases.

6. The primary light converter as defined in claim 1, wherein the primary light converter comprises a further electrically drivable unit connected with the energy converter for driving the further electrically drivable unit with the electrical energy from the energy converter, wherein the further electrically drivable unit is at least one of a cooling unit for cooling the primary light converter and a sensor for sensing at least one of a presence and a movement of an object.

7. The primary light converter as defined in claim 1, further comprising a control unit for controlling at least one of the electrical light conversion unit and the energy converter, wherein the control unit is driven by the electrical energy from the energy converter.

8. A lighting apparatus comprising:

a light source for emitting primary light, and a plurality of the primary light converters as defined in claim 1 for converting the primary light into secondary light, wherein the primary light emitted by the light source is being directed to the plurality of primary light converters.

9. The lighting apparatus as defined in claim 8, further comprising a controller for controlling the directing of the primary light to the plurality of primary light converters.

10. The lighting apparatus as defined in claim 8, wherein a first primary light converter of the plurality of primary light converters comprises a beam splitter for splitting the primary light into a first part for being directed to the light conversion unit for being converted into the secondary light, into a second part for being directed to the energy converter for being converted into the electrical energy for driving the light conversion unit, and into a third part for being directed to a second primary light converter of the plurality of primary light converters as primary light of the second primary light converter.

11. The lighting apparatus as defined in claim 8, wherein a first primary light converter of the plurality of primary light converters is adapted to convert the primary light into secondary light such that the secondary light is directed to a second primary light converter of the plurality of primary light converters as primary light of the second primary light converter.

12. The lighting apparatus as defined in claim 8, wherein the light source comprises a first lighting unit for providing a first part of the primary light and a second lighting unit for providing a second part of the primary light, wherein the lighting apparatus is adapted to direct the first part to the light conversion unit of the primary light converter and to direct the second part to the energy converter of the primary light converter.

13. A lighting method comprising following steps:

emitting primary light for being directed to a primary light converter by a light source, converting at least a part of the primary light into electrical energy by an energy converter, converting at least a part of the primary light into secondary light by an electrical light conversion unit, wherein the electrical light conversion unit is driven by the electrical energy from the energy converter.

14. A primary light converter for converting primary light into secondary light, the primary light converter comprising:

an electrical light conversion unit, the electrical light conversion unit converting at least a part of the primary light into the secondary light, an energy converter, the energy converter operable to convert at least a part of the primary light into electrical energy;

wherein the electrical light conversion unit is electrically powered by electrical energy generated by the energy converter.

* * * * *